(12) United States Patent
Mullerheim

(10) Patent No.: US 6,641,721 B2
(45) Date of Patent: Nov. 4, 2003

(54) PROCESS AND APPARATUS FOR TREATING WASTEWATER

(75) Inventor: Steven B. Mullerheim, Berkeley, CA (US)

(73) Assignee: Great Circle Technologies, Inc., San Rafael, CA (US)

(*) Notice: Subject to any disclaimer, the term of this patent is extended or adjusted under 35 U.S.C. 154(b) by 0 days.

(21) Appl. No.: 10/305,103

(22) Filed: Nov. 27, 2002

(65) Prior Publication Data

US 2003/0075502 A1 Apr. 24, 2003

Related U.S. Application Data

(62) Division of application No. 09/678,229, filed on Oct. 4, 2000, now Pat. No. 6,488,853.

(51) Int. Cl.[7] .......... B01D 21/02; B01D 21/26; B01D 29/66
(52) U.S. Cl. .......... 210/173; 210/202; 210/206; 210/259; 210/512.1; 210/532.1
(58) Field of Search .......... 210/173, 198.1, 210/202, 205, 206, 252, 259, 512.1, 532.1

(56) References Cited

U.S. PATENT DOCUMENTS

| | | |
|---|---|---|
| 3,642,617 A | 2/1972 | Brink et al. |
| 3,669,883 A | 6/1972 | Huckstedt et al. |
| 4,113,612 A | 9/1978 | Sekoulov |
| 4,146,468 A | 3/1979 | Wilson |
| 4,168,228 A | 9/1979 | Mallatt et al. |
| 4,172,781 A * | 10/1979 | Walk et al. .......... 210/626 |
| 4,193,869 A | 3/1980 | Brucker et al. |
| 4,198,294 A | 4/1980 | Deane |
| 4,211,651 A | 7/1980 | Thomas |
| 4,239,620 A | 12/1980 | Doll et al. |
| 4,271,027 A | 6/1981 | Kelly |
| 4,437,998 A | 3/1984 | Yong |
| 4,456,533 A | 6/1984 | Seitzer |
| 4,517,091 A | 5/1985 | Yamanaka et al. |
| 4,655,911 A | 4/1987 | Tabor |
| 4,865,751 A * | 9/1989 | Smisson .......... 210/788 |
| 4,952,317 A | 8/1990 | Culkin |
| 5,006,232 A | 4/1991 | Lidgitt et al. |
| 5,014,564 A | 5/1991 | Culkin |
| 5,180,499 A | 1/1993 | Hinson et al. |
| 5,188,238 A | 2/1993 | Smisson et al. |
| 5,232,586 A | 8/1993 | Malone |
| 5,308,480 A | 5/1994 | Hinson et al. |
| 5,445,740 A | 8/1995 | Malone |
| 5,462,669 A | 10/1995 | Yeh |
| 5,707,517 A | 1/1998 | Rolchigo et al. |
| 5,766,448 A * | 6/1998 | Markham .......... 209/168 |
| 5,837,142 A | 11/1998 | Mullerheim et al. |
| 6,027,656 A | 2/2000 | Henttonen et al. |
| 6,488,853 B1 * | 12/2002 | Mullerheim .......... 210/615 |

FOREIGN PATENT DOCUMENTS

| | | | |
|---|---|---|---|
| JP | 56-168877 | * | 12/1981 |
| JP | 9-168777 | * | 6/1997 |

OTHER PUBLICATIONS

Misaki et al., Night soil treatment system equipped with ultrafiltration, vol. 106, pp. 63–70, 1996, Kurita Water Industries, Ltd., Japan.

* cited by examiner

Primary Examiner—Fred Prince
(74) Attorney, Agent, or Firm—Fish & Richardson P.C.

(57) ABSTRACT

Wastewater can be treated using a combination of a settleable solids separator, such as a vortex separator, and a gas floatation separation system.

19 Claims, 6 Drawing Sheets ial application of and claims
PROCESS AND APPARATUS FOR TREATING WASTEWATER

CROSS-REFERENCE TO RELATED APPLICATIONS

This application is a divisional application of and claims priority to U.S. patent application Ser. No. 09/678,229, filed on Oct. 4, 2000 now U.S. Pat. No. 6,488,853.

TECHNICAL FIELD

This invention relates to a process and apparatus for treating wastewater.

BACKGROUND

Declining water tables, population growth, increasing industrialization, expanding use of irrigated agriculture, and pollution of fresh water supplies strain limited fresh water supplies around the world. Reclaimed wastewater can serve as a supplemental source of water, particularly for non-potable uses. Irrigation of crops and landscaping, which constitutes approximately 70% of total water demand and which also benefits from some of the nutrients present in wastewater, represents one suitable non-potable use for reclaimed water. Other appropriate non-potable applications for reclaimed wastewater include washing, cooling, fire prevention and control, creek enhancements, fountains, recreational ponds, cement preparation, dust control, and toilet flushing. Despite the wide range of non-potable uses, wastewater reclamation typically has been practiced only on a very small scale. Conveyance of reclaimed water from the reclamation site to a site of use and limited production methods can represent obstacles to more widespread use of reclaimed water.

Effective and efficient treatment of wastewater is economically and environmentally important. Wastewater treatment systems can include incineration systems, chemical treatment systems, electrolysis systems, nuclear radiation systems, and physical treatment systems. These various systems can provide water of varying quality. Many of theses systems can be costly and relatively difficult to run and maintain. Physical treatment systems such as filtration can be difficult to develop because of fouling problems and retarded flow. In addition to chemical and pathogenic impurities, incoming wastewater can include settleable solids, such as hard and abrasive materials, that can damage components of the treatment system and floatable materials, such as fats, oils, greases and fibers that can foul a physical treatment system. Useful systems for wastewater treatment can provide consistent output, be capable of automation, be relatively small in size, provide usable liquid and solid byproducts, and be relatively low in cost.

SUMMARY

In general, the invention features a process and apparatus for treating wastewater streams into beneficial water and solids components using air floatation separation as a principal treatment. Removal and segregation of materials that adversely affect operation of the air floatation separator earlier in the treatment process can improve water throughput, water quality and the lifespan of system components. Physical separation of settleable solids and floatable materials from the wastewater prior to treatment with a gas floatation separation system can allow higher flow rates to be achieved.

In one aspect, the invention features a method for treating wastewater containing settleable solids to form a reusable liquid fraction. The method includes separating a wastewater stream into a first component and a second component in a first containment zone, and passing the second component into a second containment zone including a gas floatation separation system to form a froth fraction and a reusable liquid fraction. The first component includes an amount of settleable solids greater than an amount of settleable solids in the second component. The method can include comminuting the wastewater stream prior to separating the first component and the second component.

Separating can include settling settleable solids by gravity. In certain embodiments, separating can also include settling settleable solids by forces generated by wastewater stream flow into a separation tank.

The method can include introducing bubbles of gas into the second component in the gas floatation separation system, retaining the second component in the second containment zone for an interval sufficient to allow the bubbles to rise and pass through the second component to form the froth fraction, and removing the froth fraction from the second containment zone to leave behind the reusable liquid fraction. The rising bubbles can adsorb suspended particles and dissolved organic compounds and float them to the surface of the second containment zone and forming the froth fraction. The method can also include combining the first component and the froth fraction to form a slurry stream, and, in certain embodiments, treating the slurry stream. The gas can include ozone.

The reusable liquid fraction can be disinfected. This can be accomplished by, for example, exposing the reusable liquid fraction to ultraviolet radiation. In certain embodiments, disinfecting can include mixing a chemical oxidant, such as ozone, with the reusable liquid fraction.

The reusable liquid fraction can be applied to unsaturated soil. The soil can assist in removal and productive reuse of plant nutrients contained in the reusable liquid fraction, and return purified water to underlying aquifers.

The method can include passing the reusable liquid fraction through a filter system. The filter system can be backflushed, for example, to create a volume of backflushed material and that can be combined with the slurry stream.

The filter system can include a filter Medium coated with a biofilm within a third containment zone. Contact with the biofilm can result in removal of remaining suspended solids, nitrification of dissolved and suspended organic nitrogen compounds, and reduction of other sources of biochemical oxygen demand.

The wastewater can be obtained from a sewer. The first component and the froth fraction can be combined to form a slurry stream that can be returned to the sewer downstream of the location from which the wastewater was obtained. In certain embodiments, the slurry stream can be passed into a third containment zone to separate it into a supernatant fraction and a settled fraction. Sufficient retention time in the third containment zone can allow for substantial settling of settleable solids to the bottom of the zone. In the third containment zone, solids can be decomposed by a predominately anoxic biological process. The supernatant fraction can be returned to the first containment zone or the second containment zone, or passed to an underground leach field.

In another aspect, the invention features an apparatus for treating wastewater containing settleable solids. The apparatus includes a settleable solids separator and a gas floatation separation system. The settleable solids separator includes a vessel having an upper end, a lower end, and an outer wall connecting the upper end and the lower end. The settleable solids separator also includes an inlet directed partially tangentially through the outer wall of the vessel, a first outlet proximate to the upper end of the vessel, and a second outlet proximate to the lower end of the vessel. The gas floatation separation system includes an inlet port and a reusable liquid fraction outlet port. The apparatus includes a fluid conduit fluidly connecting the first outlet of the settleable solids separator and the inlet port of the gas floatation separation system.

The settleable solids separator can be a vortex separator. The settleable solids separator can also include a vent and overflow port positioned between the first outlet and the upper end of the vessel. The second outlet of the settleable solids separator can be a settled solids outlet in communication with an opening in the base of the vessel for removing solids, which are swept towards the opening by a vortex. The gas floatation separation system can separate and remove remaining settleable and suspended solids, and certain dissolved solids, in the supernatant of the settleable solids separator.

The gas floatation separation system can include a gas floatation separation vessel including an upper end, a lower end, and an outer wall connecting the upper end and lower end. The inlet port can be proximate to the upper end of the vessel and the reusable liquid fraction outlet port can be between the inlet port and the lower end. The vessel can also include a scum overflow and vent port between the inlet port and the upper end and a gas injection port between the scum overflow and vent port and the lower end. The gas injection port can be part of a liquid circulation circuit including a port at a low elevation in the gas floatation separation vessel, a pumping inlet conduit, pump, venturi nozzle, and a return conduit in communication with the gas injection port. Liquid circulating through the nozzle draws gas into the stream in the form of small bubbles, which are introduced into the gas floatation separator through the gas injection port.

A clarified liquid conduit can fluidly connect the reusable liquid fraction outlet port of the gas floatation separation vessel with a disinfection system, which can include an ultraviolet disinfection system or an ozone treatment system, or both. The ultraviolet disinfection system can include one or more clear plastic tubes that are transparent to ultraviolet radiation and through which the reusable liquid fraction passes, ultraviolet lamps surrounding the plastic tubes, and an enclosure containing the assembly of tubes and lamps. The ultraviolet lamp apparatus can produce ozone in the air space surrounding the lamps. The ozone can be extracted from the enclosure, which can serve as an ozone generator. An ozone transport conduit can fluidly connect a closed atmosphere of the settleable solids separator and a closed ozone treatment vessel of the ozone treatment system. Exposure to ultraviolet radiation can directly kill organisms, and if dissolved ozone is contained in the liquid, it can create powerful oxidizing agents that further disinfect, remove odor and color, reduce biochemical oxygen demand of, and oxidize harmful chemical compounds in the liquid.

The apparatus can include a wastewater pump, such as a comminuting wastewater pump in fluid communication with the inlet of the settleable solids separator.

The apparatus can also include a flow restrictor in fluid communication with the reusable liquid fraction outlet port of the gas floatation separation system. The flow restrictor can be used to regulate the flow of the process. Periodically, the flow restrictor can be used to retard flow so as to cause the liquid levels of both the vessel of the settleable solids separator and the vessel of the gas floatation separator to rise beyond the overflow ports of both vessels, thereby forcing accumulated scum layer and other floating material on the surface of the vessels to be discharged to the slurry stream.

In certain embodiments, the apparatus can include a filter system in fluid communication with the reusable liquid fraction outlet port of the gas floatation separation system. The system can be a backflushable filter system.

The scum overflow and vent port can be in fluid communication with a slurry fraction conduit. The slurry fraction conduit can be in fluid communication with the second outlet of the settleable solids separator.

In particular embodiments, the apparatus can include a solids treatment system. The solids treatment system can include an inlet port and an outlet port. The inlet port can be in fluid communication with the slurry fraction conduit. The solids treatment system can include a vessel with an inlet port in communication with the slurry stream, and an outlet port. The solids treatment system can have a volume sufficient to allow the settleable solids in the slurry stream an opportunity to settle and decompose by, for example, predominantly anoxic biological processes. The outlet port of the solids treatment system can be in fluid communication with the inlet of the settleable solids separator. The outlet port of the solids treatment system can be in fluid communication with the inlet of the gas separator vessel or said gas floatation separation system.

The apparatus can also include a membrane separation system in fluid communication with the reusable liquid fraction outlet port.

In another aspect, the invention features a process for reducing odors in a vessel containing wastewater including introducing ozone into an airspace of the vessel. The ozone can be surplus ozone from an ozone treatment stage of wastewater treatment. The vessel can be sewer or a portion of a sewer.

The method offers a simple, reliable, rapid, compact and inexpensive process for obtaining reusable water, which can overcome many of the deficiencies of conventional biological wastewater treatment processes. For example, the apparatus and method performs more reliably and efficiently than paper filter, membrane, or biological systems alone. The apparatus is a complete wastewater reclamation system that, among other things, can minimize conveyance costs, can avoid the use of inherently unreliable and maintenance-intensive wastewater treatments, can overcome certain limitations of past physical or chemical systems, can produce reusable or readily disposed residual byproducts, can be compact, economical, reliable, and odorless, and can produce high quality thoroughly disinfected water appropriate to various reuse applications, such as irrigation and other non-critical reuse applications, washing, cooling and other industrial uses, or aquaculture and for discharge to surface water bodies. The method an apparatus can also create an odorless environment in the surrounding of the apparatus. Accordingly, the wastewater reclamation system can be well suited for on-site or local applications in which the water produced is reused productively in the vicinity of the treatment plant.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
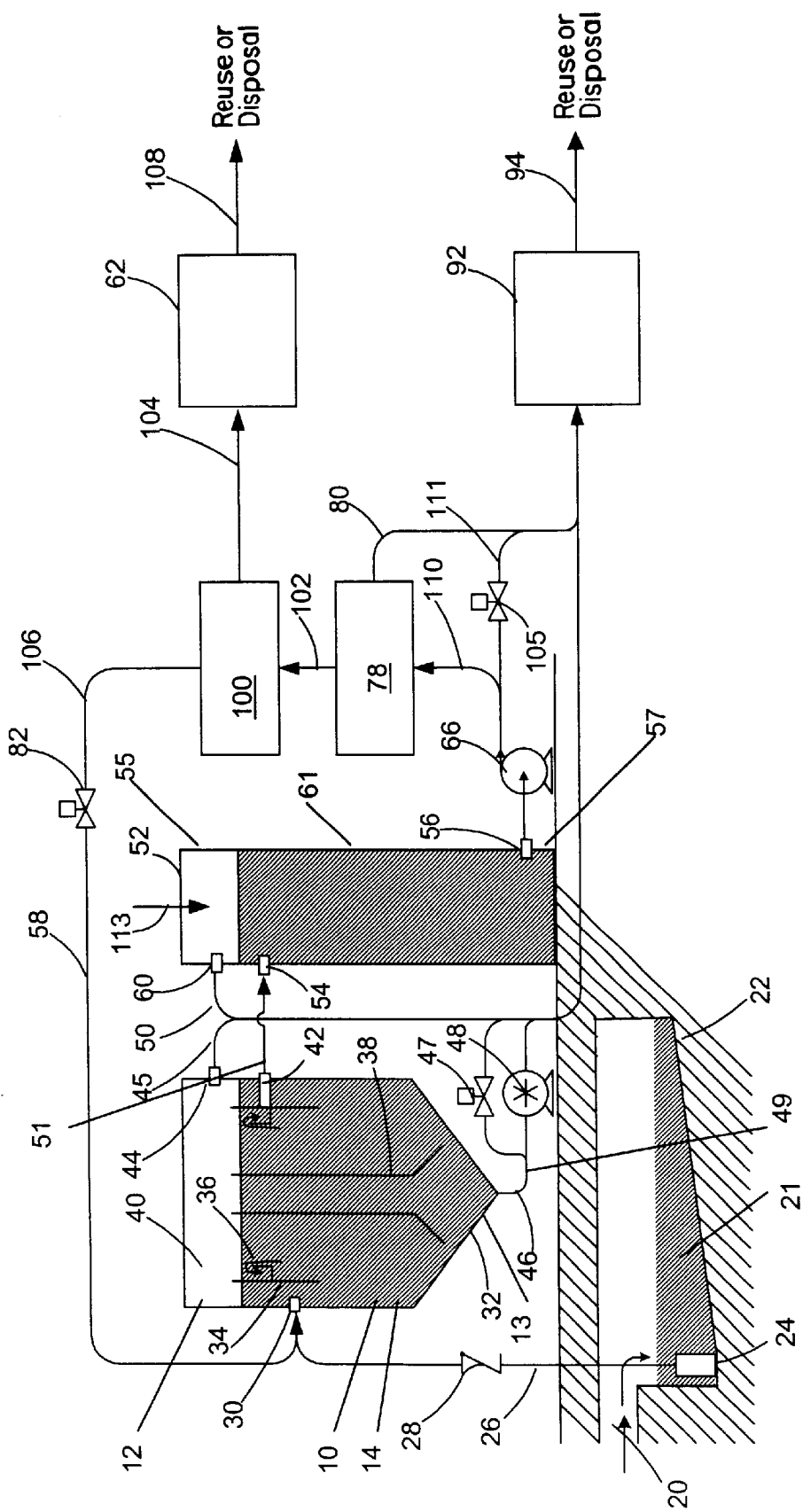
FIG. 1 is a schematic view of a water reclamation system including a solids treatment system.
Figure 2:
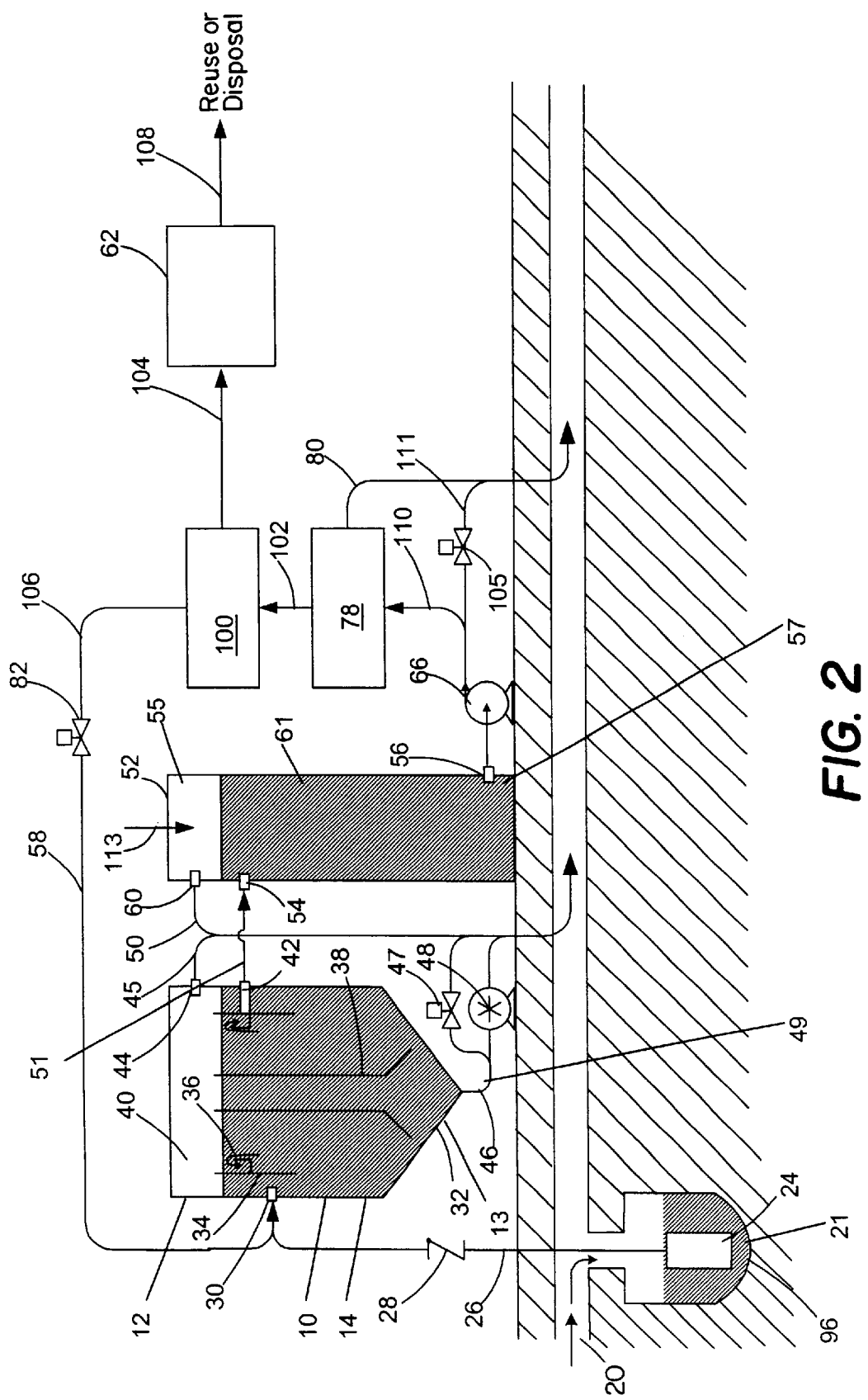
FIG. 2 is a schematic view of a water reclamation system including a return for carrying solid residuals to a sewer.

Referring to FIGS. 1–2, a water reclamation system includes settleable solids separator 32, such as a vortex separator, gas floatation separation system 52, such as a foam fractionation tank, filter system 78, such as a back-flushable filter system, disinfection system 65, and solids treatment system 92 (FIG. 1) or sewer 20 (FIG. 2). Disinfection system 65 includes ozone treatment system 76 and ultraviolet disinfection system 84. Wastewater 21, which can contain sanitary and other wastes, collects in underground storage tank 22 (FIG. 1) or wet well 96 (FIG. 2). Underground tank 22 contains submersible sewage pump 24. Preferably, pump 24 is a comminuting pump, such as a chopper pump manufactured by Vaughan Chopper Pumps of Montesano, Washington, which simultaneously chops, or comminutes, larger solids in wastewater 21 into a slurry. The slurry is pumped via conduit 26, through check valve 28 and into settleable solids separator 32 through inlet port 30 of settleable solids separator 32.

Settleable solids separator 32 includes vessel 10 having upper end 12 connected to lower end 13 by outer wall 14. First outlet 42 is located in outer wall 14 near upper end 12. Inlet port 30 is directed partially tangentially through outer wall 14 near upper end 12. Second outlet 46 is proximate to lower end 13. Closed atmosphere 40 of separator 32 fluidly communicates with vent and scum overflow port 44 connected to vent and scum overflow conduit 45. Lower end 13 includes second outlet 46, which is connected to conduit 49 which includes solids pump 48. Solids pump 48 can be, for example, a progressing cavity pump available from Moyno Inc. of Springfield, Ohio. Referring to FIG. 1, solids pump 48 and drain valve 47 empty through conduit 45 into solids treatment system 92, which discharges treated material through output port 94. Referring to FIG. 2, solids pump 48 and drain valve 47 empty through conduit 45 into sewer 20.

Figure 3:
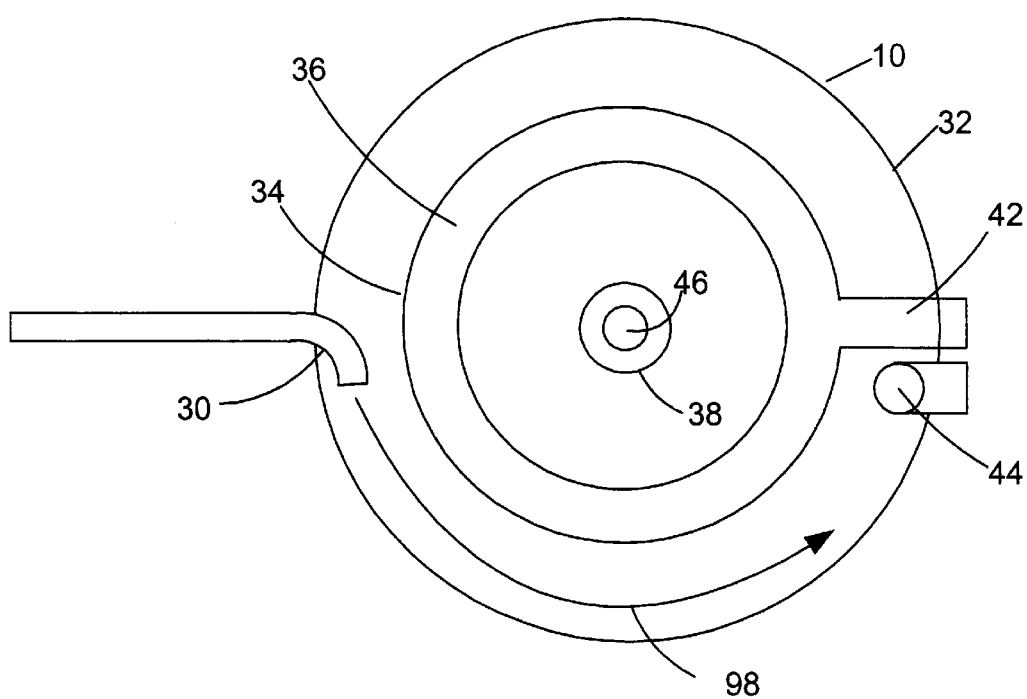
FIG. 3 is a plan view of a separation tank.

Referring to FIG. 3, inlet 30 of separator 32 is directed to create centrifugal flow pattern 98 that passes around annular dip plate 34, spillway 36, and the top of baffle 38. Spillway 36 is attached to the inner wall of dip plate 34. First outlet 42 draws fluid from spillway 36. Vent and scum overflow port 44 is located to one side of separator 32. Second outlet 46 is centered in vessel 10. Annular inner baffle 38, which flares out in a conical shape as it approaches second outlet 46.

Referring to FIGS. 1–3, first outlet 42 delivers the contents of spillway 36 to gas floatation separation system 52 via fluid conduit 51. Referring to FIGS. 1–2 and 4–5, gas floatation separation system 52 includes vessel 53 that receives output of settleable solids separator 32 through inlet port 54. Inlet port 54 is proximate to upper end 55 of vessel 53. Vessel 53 has reusable liquid fraction outlet port 56 below inlet port 54 and proximate to lower end 57. Gas injection port 58 is positioned somewhat above port 56 and proximate to lower end 57, and a scum overflow and vent port 60 toward upper end 55 of vessel 53 draining to conduit 50. Outer wall 61 connect lower end 57 and upper end 55.

Outlet port 56 is fluidly connected to disinfection system 65. Outlet port 56 is part of a circuit feeding back to gas injection port 58 through circulation pump 66, conduit 68, gas injector nozzle 70, and conduit 74. Conduit 68 feeds ozone treatment system 69. Gas for the floatation separation system, such as a mixture of ozone and air from ozone generator 76, feeds injector 70. Sidestream conduit 72 from conduit 68 conveys a portion of the output from pump 66 through filter 78, which can be a backflushable filter, flow control valve 82, and ultraviolet disinfection system 84 to output equalization tank 86 through inlet port 88. Reusable liquid fraction is discharged from outlet 90.

Referring to FIG. 2, residual solids are returned to sewer 20. Wastewater 21 from sewer 20 drains into a wet well 96, which is at an elevation lower than that of sewer 20. Rather than employ a separate solids treatment system, settled solids from pump 48, foam, gas and floatable solids from conduits 45 and 50 and filter backflush from conduit 80 drain back to sewer 20 at points downstream of the entrance to wet well 96.

Figure 4:
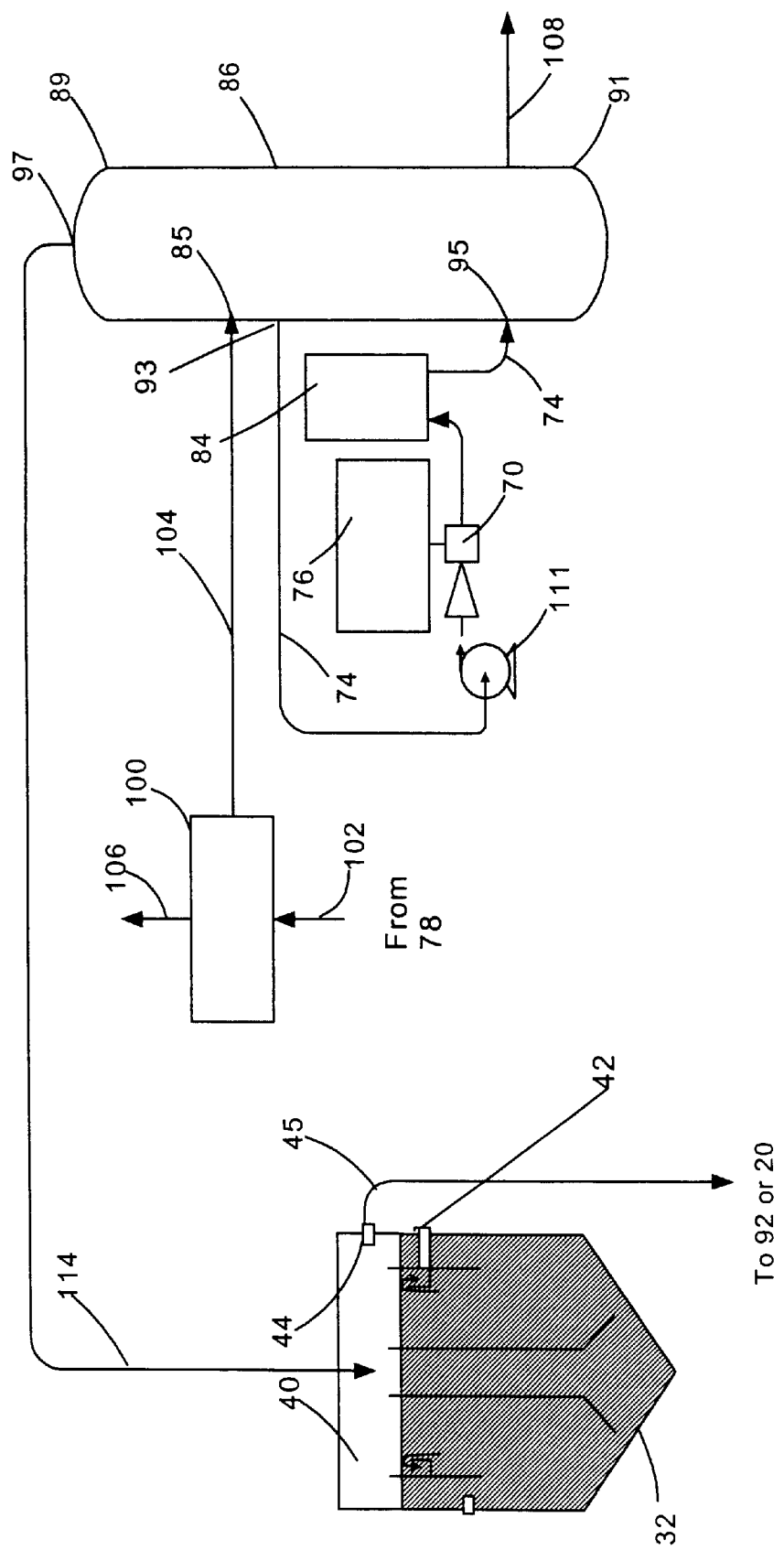
FIG. 4 is a schematic view of filtration and disinfection portions of the water reclamation system, the filtration portion being a membrane separation system.

Referring to FIG. 4, filter system 65 can include membrane separation system 100. Suitable membrane separation systems are available from Komline-Sanderson of Peapack, New Jersey and New Logic International of Emeryville, California and are described, for example, in U.S. Pat. Nos. 6,027,656, 4,952,317, 5,014,564 and 5,837,142, each of which is incorporated herein by reference. A system containing the membrane separation system can produce water free of particulate materials primarily for industrial applications, such as washing and cooling, with return of residuals to a sewer. Outlet 56 of gas floatation separation system 52 is fluidly connected to pump 66, which outputs to membrane separation system 100. Bypass valve 108 controls flow to ozone treatment system 69, flow control valve 82 controls flow to membrane separation system 100, and drain valve 109 controls flow to sewer 20. Membrane separation system 100 has both a concentrate output 106 and a permeate output 104. Conduits 106 and 110 merge to feed gas injector nozzle 70, which is fluidly connected to gas inlet 58 of vessel 53 through conduit 74. Permeate output is fluidly connected through conduit 104 to ultraviolet disinfection system 84 and inlet port 88 of output equalization tank 86. Conduit 104 is also connected to drain valve 105. Drain valves 105 and 109 empty to sewer 20 through conduits 107 and 111, respectively. When necessary, cleaning solution can be supplied to gas floatation separation system 52 through conduit 113 to tank 52.

In operation of the systems of FIGS. 1–4, wastewater 21 entering underground tank 22 or well 96 is pumped via pump 24 through check valve 28 into settleable solids separator 32 through port 30, where flow is directed tangentially to wall 14, thereby causing the contents of the separator to slowly circulate. Floatable substances, such as fats, oils and greases, in the wastewater quickly rise along the tank periphery as the contents of the separator circulate, causing them to become trapped predominantly in the annular space between dip plate 34 and wall 14. Settleable solids, such as grit, sand, stones, razor blades, plastics, and other foreign solid materials, in the wastewater fall to the bottom of separator 32 by circulating along the outer periphery of the separator. As the settleable solids reach the bottom of the separator, they are swept inward by centripetal forces created by the differential velocities of the circulating fluid on the outside of the baffle and the relatively stationary liquid toward the center. Solids reaching the outer inclined surface of baffle 38 gradually slide downward and out onto the conical bottom surface of the tank. Centripetal forces created by the relatively quiescent conditions under baffle 38 sweep settled solids inward and trap them under the baffle. Once trapped inside the baffle, suspended solids slowly agglomerate and settle to the bottom. The settled solids exit the separator through outlet 46. Liquid relatively free of settleable and floatable solids and containing primarily dissolved and suspended solids rises toward the top of the separator inside of annular dip plate 36, exiting the separator through spillway 36 and port 42. The component exiting through port 46 contains a greater amount of settleable solids than the component exiting through port 42.

The fluid component exiting port 42 enters gas floatation separation system 52 at inlet 54, where it encounters a continuous rising current of small gas bubbles 62, such as an air-ozone mixture, injected at port 58 that rise in the liquid of separator 52. Bubbles 62 lift solids and floatable material to liquid surface. The air-ozone bubbles lift suspended solids, proteins, oils, detergents and other surfactants in the fluid to the surface and form froth fraction 64 of foam and scum by foam fractionation. The addition of ozone to the air injected by nozzle 70 can assist in disinfection, removal of odor and color, and reduction of chemical oxygen demand in the fluid. The downward flow of liquid from inlet port 54 to outlet 56 opposes the upward flow of the bubbles, increasing the duration and extent of liquid-bubble contact.

A reusable liquid fraction exits outlet 56 in a purified state. The reusable liquid fraction is substantially free of suspended, settleable and floatable solids, and can be deodorized, disinfected, and color free. Under pressure from pump 66, a portion of the reusable fraction is diverted by conduit 72 to pass through backflushable filter system 78 that traps any larger suspended solids that might remain. The filtrate from filter system 78 passes through flow control valve 82, and then through ultraviolet disinfection system 84, which kills organisms in the reusable liquid fraction that might still be viable by imparting direct germicidal radiation. Ultraviolet radiation from system 84 also destroys residual ozone in the reusable fraction by, for example, converting dissolved ozone into hydrogen peroxide and highly reactive free radicals that further disinfect the water, remove color and odor, and oxidize undesirable substances. Backflush from filter 78 is conveyed to solids treatment system 92 by conduit 80, where it joins settled and floatable solids, and foam and gases from the prior treatment stages.

Several types of filter systems can be selected for filter system 78. One preferred system is a backflushable filter system that uses a plurality of disk filters, such as the disk filtration systems manufactured by Arkal Filtration Systems of Kibbutz Bet Zera, Jordan Valley, Israel, which are capable of filtering out materials as small as 10 microns, provide continuous flow using a plurality of filter modules. Suitable filter systems are described in U.S. Pat. No. 4,655,911, which is incorporated herein by reference. In the system depicted in FIG. 1, a filter porosity of 20 microns or less is desirable to remove particulate materials of concern. The backflushable filter system can use a simple and reliable backflush method that backflushes one filter module at a time, while the modules not being backflushed continue to be available to filter water. An air-assisted backflushing step can produce a low volume of backflush, which can decrease the backflush output of the system. The backflushable filter system can employ an automatic backflush cycle that is triggered when the pressure differential across the component filters exceeds a predetermined value.

The settling of solids and gas floatation separation that precede a backflushable filter system remove a large fraction of settleable, floating and suspended solids in the wastewater, thereby minimizing the workload for the filter and correspondingly, the duration and frequency of backflushing that is needed. Also, when ozone is used in the gas floatation separation system, biological growth in filter system 78 can be reduced or eliminated.

Flow control valve 82, sewage pump 24, circulation pump 66, and settled solids pump 48, work in a coordinated manner to control the overall system. When operation is first initiated, pump 66 is operated to charge gas floatation separation system 52 with air and ozone, thereby purifying water in vessel 53, while pump 24 remains turned off and valve 82 is closed to block any output. After an interval sufficient to clean the water at the bottom of vessel 53, sewage pump 24 is started and valve 82 is opened. Flow rates are set to maintain a desired flow rate through the system. Under ordinary operating conditions, valve 82 typically is set to match the flow into the system through pump 24 so that the liquid levels in vessels 10 and 53 remain stable. One way to control flow through valve 82 is by interconnecting it with a float pilot valve in vessel 53, such as is provided by the Bermad model 700-60 float-controlled valve system available from Bermad Control Valves of Anaheim, California.

During operation of the system, scum layers will develop on the surfaces of the liquid in both vessels 10 and 53. Scum layers can be purged from the system by periodically closing valve 82 for an interval while leaving input pump 24 running. This causes the liquid levels in both vessels 10 and 53 to rise, and eventually spill over through ports 44 and 60 through conduits 45 and 50 into solids treatment system 92 (FIG. 1) or sewer 20 (FIG. 2). Once the scum layers have been purged, valve 82 can be opened again to modulate flow by valve 82 to return the liquid level in tank 52 to the target level.

Settled solids pump 48 is turned on and off periodically in coordination with the total flow through the system to meter out controlled amounts of solids residuals to solids treatment system 92 (FIG. 1) or sewer 20 (FIG. 2). For the embodiment of FIG. 1, the solids are concentrated to a high degree prior to treatment, in the range of 5% solids by weight, to minimize the volumes in need of subsequent treatment. The higher solids contents can be achieved by metering the solids residuals using pump 48. Normally drain valve 47 is closed, but it can be opened to drain tank 32 quickly.

Settleable solids separator 32 and gas floatation separation system 52 both can have closed atmospheres. This prevents release of odorous gases to the environment surrounding the system. Additional odor control can be provided by surplus ozone released under pressure to airspace 41 of vessel 53 from the rising injected bubbles 62 in the tank. This ozone can also permeate airspace 40 of vessel 10, as well as interconnecting conduits and solids treatment system 92. This ozone-containing atmosphere can further reduce odors by, for example, oxidizing $H_2S$, mercaptans, and other malodorous or harmful gases in the airspaces. Chemical reactions with the ozone not only deodorize and destroy these materials, but also consumes excess ozone.

The reusable liquid fraction generated by the system can be substantially clear, odorless, colorless, disinfected, and free of suspended solids. The reusable water recovered using the system depicted in FIG. 1 can have beneficial attributes for irrigation use. For example, the water can contain organic forms of desirable plant nutrients, including trace minerals and nitrogen in organic forms such as urea, which can then be captured by soil particles and converted slowly into nitrates usable by plants. In addition, the reusable water can contain detergents, which can render heavy clay soils more porous, and hydrogen peroxide created by ozone injection, which can improve the health and activity of plant roots.

The treatment process can be relatively rapid. The size of the system can be determined, in part, by the dimensions of vessels 10 and 53, which can be taller than they are wide, and have relatively small volume. Typical water retention times are approximately 15 minutes in vessel 10, and 10 minutes in vessel 53. In comparison, biological treatment systems can have hydraulic retention times between 4 hours and several days. Wastewater can be treated in approximately 30 minutes in surface tanks, which can preserve the heat value of the wastewater, which can be supplemented by the pumping energy added by the equipment. Since municipal wastewater typically has a temperature of 65–70° F., the heat can be released in greenhouses during cold months. In addition, because the systems of FIGS. 1–2 and 4 use physical separation methods, intermittent use of the system can be facilitated, for example, when there is need for the water. Systems that use biological purification methods can require more stable operating conditions than physical systems.

The system depicted in FIG. 2 can be compact, having a very small footprint, rendering it very practical for potential deployment in developed areas where land is scarce and land prices are high. In addition, because the solids are returned to the sewer, there is a decreased need to concentrate solids to a high degree Accordingly, pump 48 can be operated with a higher duty cycle than in the system of FIG. 1.

The compact nature of the system, and the low odor and noise emissions of the system, allow it to be sited close to populated areas. As long as there are sewers nearby, the system can be sited near a location where the,recycled water is needed, such as, for example, in an urban park or a golf course. The attributes of the system allow lower cost and more practical wastewater reclamation to be achieved.

Referring to FIG. 4, the system can be operated by first opening valve 108 for a period of time to allow gas, such as air and ozone, to fill vessel 53, thereby purifying the water exiting port 56. Valves 82 and 109 can be closed at this point, blocking any output from the system. After an interval to assure that water is purified sufficiently, valve 108 can be closed and valve 82 can be opened to regulate flow to match that of the input pump, as described above. Subsequently, all flow follows the circuit through membrane separation system 100, with a sidestream exiting the system as permeate through conduit 104 and passing through ultraviolet disinfection system 84. Over time, suspended and dissolved solids in vessel 53 can become increasingly concentrated, which can foul the membrane of system 100. Fouling of the membrane can result in higher feed pressure when the permeate flow rate is maintained. When higher pressures are detected by an external control system, a cleaning cycle can be initiated after a predetermined pressure threshold is reached. During the cleaning cycle, the following sequence can be followed: (1) flow to vessel 53 through inlet port 54 is stopped by shutting off pump 24; (2) vessel 53 is purged by opening drain valve 109, and closing valves 108 and 82; (3) vessel 53 is filled with a cleaning solution, such as, for example, a combination of hot water and lye through input 113; (4) valve 82 and 105 are opened; (5) the cleaning solution is circulated for a period of time through membrane separation system 100, with a fraction thereof exiting as permeate through valve 105 back to sewer 20; and (6) valve 82 is closed and valve 109 is opened, causing the cleaning solution to be pumped out of tank 52 through valve 109, conduit 111 and into sewer 20. Following the cleaning cycle, the startup sequence can be initiated by opening valve 108, closing valves 105 and 109, and turning on pump 24 to cause new fluid to be admitted to tank 52 through inlet 54.

The separating characteristics of membrane separation system 100 can be used more efficiently because most of the settled, floating, and suspended solids of the wastewater have been removed by settleable solids separator 32 and gas floatation separation system 52. In addition, the introduction of ozone into the flowstream prior to membrane separation can decrease the formation of biological growths that can occur in system 100, and can adversely affect its efficiency.

Figure 5:
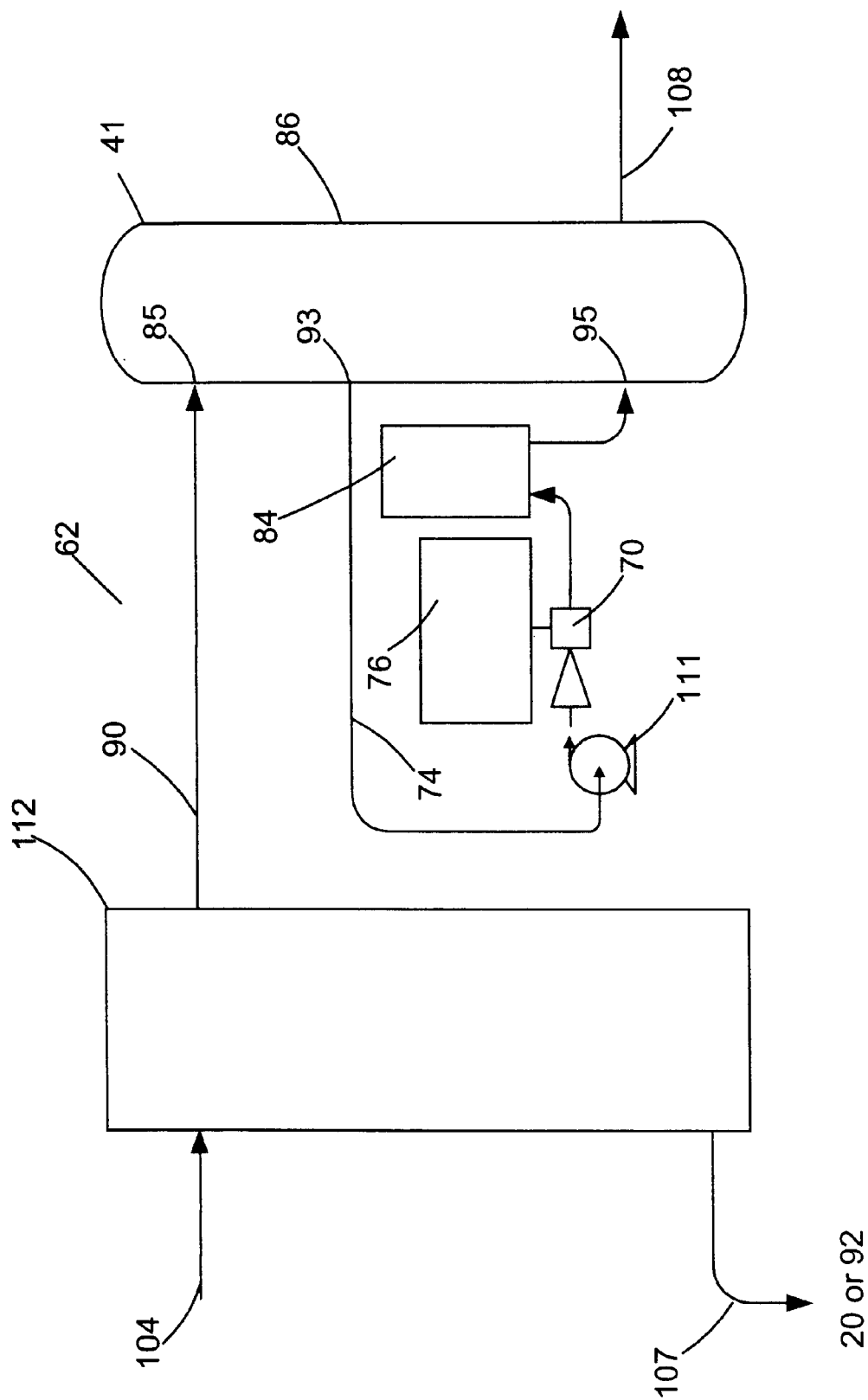
FIG. 5 is a schematic view of filtration and disinfection portions of the water reclamation system, the filtration portion including a backflushable biofilter system.

Referring to FIG. 5, filter system 65 can include backflushable biofilter system 112 as the filter element in combination with ultraviolet disinfection system 84. When biofilter system 112 is present, the reusable liquid fraction can be used in applications such as aquaculture or discharge to surface water bodies where it can be important that the nitrogen compounds in the water be nitrified and have a low biochemical oxygen demand. For aquaculture use, the rapid treatment process can preserve heat in the water. In general, filter 78 is replaced by backflushable biofilter system 112. Only air is admitted to the flowstream of conduit 74 through injector nozzle 70, since ozone can destroy the biofilm on the biofilter medium. Air provides the gas for floatation separation in system 52 and drives out malodorous gases, and furthermore, provides oxygen needed by the aerobic organisms of the biofilter. The biofilter system typically is not compatible with ozone. Suitable backflushable biofilter systems are described in U.S. Pat. Nos. 5,232,586 and 5,445,740, where are incorporated herein by reference, and include the Bubble Washed Bead Filters and Propeller Washed Bead Filters manufactured by Aquaculture Systems Technologies L.L.C. of Jefferson, La. Since ozone is not injected into the flowstream, disinfection is provided by ultraviolet disinfection system 84. Backflushing of biofilter systems can be accomplished using gravity with compressed air or a motorized propeller to agitate the filter medium and to loosen accumulated material. The frequency of backflushing for the biofilter system can be carried out at a regular operational interval, or can be triggered by an increase in feed backpressure.

Figure 6:
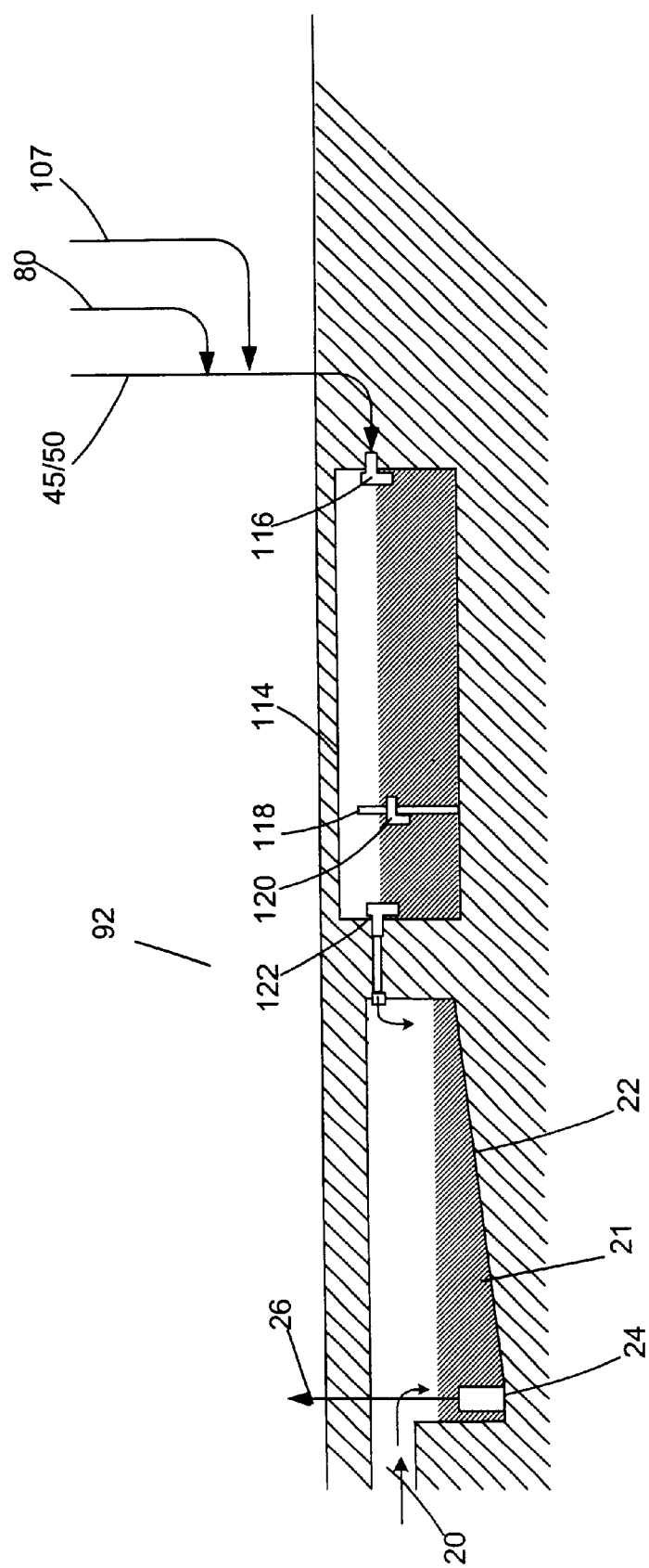
FIG. 6 is a schematic view of a solids treatment system.

Referring to FIG. 6, solids treatment system 92 includes underground tank 114, which can resemble a septic tank for treatment of residential wastewater. Tank 114 has an inlet port 116, baffle 118 and conduit 120 between two containment zones of the tank, and outlet port 122. Inlet port 116 receives by gravity settled solids, gases, foam, and floatable solids collected in other parts of the system from conduits 45 and 50 and the filter backflush of 30 conduit 80. Output of tank 114 is conveyed through port 122 back to tank 22.

Operation of solids treatment system 94 can be similar to that of a septic tank. The system can operate as an unheated, unmixed anaerobic digester. By design, solids concentrations of the influent can be up to 50 to 100 times greater than that in a typical septic tank for a single family home. As a result, the retention times in the tank can be increased to allow suspended solids considerable time to agglomerate and settle. If, for example, a typical single family septic tank of 1000 gallons retention were used to treat the sewage of 20 homes, the retention time would be approximately 8 to 16 days. The liquid of tank 114 in the clear space between the settled and scum layers can be returned to tank 22 of the system rather than to a leach field. Such liquid will already have undergone partial decomposition by both facultative and anoxic processes. The fate of certain dissolved materials remaining in the liquid returned from tank 114 to tank 22 will differ depending on the type of filtration used in the system are summarized in Table 1.

TABLE 1

| Type of Dissolved Material | Fate with Biofilter | Fate with Other Types of Filters |
|---|---|---|
| Ammonia, urea and other organic nitrogen compounds | Nitrified to nitrate forms | Passed on to output unchanged |
| Carbohydrates | Oxidized to $H_2O$ and $CO_2$ | Passed on to output unchanged |

Ozone gas from airspace 41 of vessel 53 can enter the airspace of solids treatment system 92 to destroy $H_2S$, $CH_4$ and odors. As with a conventional septic tank, grit and other inert residual solids in the tank can be removed and disposed periodically, such as by pump truck.

A number of embodiments of the invention have been described. Nevertheless, it will be understood that various modifications may be made without departing from the spirit and scope of the invention. For example, although Municipal and sanitary wastewater can serve as predominant sources of wastewater, other sources are also suitable, including fish tanks and ponds, livestock feedlots, food processing plants, lakes, rivers and streams. In addition, reverse osmosis can be used as a post treatment to the membrane separation system if water of the highest purity is desired. Furthermore, a solids treatment system can be used in conjunction with a membrane separation system. In embodiments, ozone injection can be used as a supplementary treatment for the effluent from a biofilter system or a grinder assembly can be used with the settled solids pump. Moreover, other solids treatment systems, such as a heated and mixed anaerobic digester or an autothermal thermophillic anaerobic digester (ATAD) can be used.

What is claimed is:

1. An apparatus for treating wastewater containing settleable solids comprising:
    a settleable solids separator comprising:
        a vessel having an upper end, a lower end, and an outer wall connecting the upper end and the lower end;
        an inlet directed partially tangentially through the outer wall of the vessel;
        a first outlet proximate to the upper end of the vessel; and
        a second outlet proximate to the lower end of the vessel;
    a gas floatation separation system having an inlet port and a reusable liquid fraction outlet port; and
    a fluid conduit fluidly connecting the first outlet of the settleable solids separator and the inlet port of the gas floatation separation system.

2. The apparatus of claim 1, wherein the settleable solids separator is a vortex separator.

3. The apparatus of claim 1, wherein the settleable solids separator further comprises a vent and overflow port positioned between the first outlet and the upper end of the vessel.

4. The apparatus of claim 1, wherein gas floatation separation system comprises:
    a gas floatation separation vessel comprising an upper end, a lower end, and an outer wall connecting the upper end and lower end, wherein the inlet port is proximate to the upper end of the vessel and the reusable liquid fraction outlet port is between the inlet port and the lower end, the vessel further comprising:
        a scum overflow and vent port between the inlet port and the upper end; and
        a gas injection port between the scum overflow and vent port and the lower end.

5. The apparatus of claim 4, wherein the scum overflow and vent port is in fluid communication with a slurry fraction conduit, the slurry fraction conduit being in fluid communication with the second outlet of the settleable solids separator.

6. The apparatus of claim 5, further comprising a solids treatment system comprising an inlet port and an outlet port, the inlet port being in fluid communication with the slurry fraction conduit.

7. The apparatus of claim 6, wherein the outlet port of the solids treatment system is in fluid communication with the inlet of the settleable solids separator.

8. The apparatus of claim 6, wherein the outlet port of the solids treatment system is in fluid communication with the inlet of the, gas separator vessel or said gas floatation separation system.

9. The apparatus of claim 1, further comprising a clarified liquid conduit fluidly connecting the reusable liquid fraction outlet port of the gas floatation separation vessel with a disinfection system.

10. The apparatus of claim 9, wherein the disinfection system includes an ultraviolet disinfection system.

11. The apparatus of claim 10, wherein the disinfection system further includes an ozone treatment system.

12. The apparatus of claim 10, wherein the disinfection system includes an ozone treatment system.

13. The apparatus of claim 12, further comprising an ozone transport conduit fluidly connecting a closed atmosphere of the settleable solids separator and a closed ozone treatment vessel of the ozone treatment system.

14. The apparatus of claim 1, further comprising a wastewater pump in fluid communication with the inlet of the settleable solids separator.

15. The apparatus of claim 14, wherein the wastewater pump is a comminuting wastewater pump.

16. The apparatus of claim 1, further comprising a flow restrictor in fluid communication with the reusable liquid fraction outlet port of the gas floatation separation system.

17. The apparatus of claim 1, further comprising a filter system in fluid communication with the reusable liquid fraction outlet port of the gas floatation separation system.

18. The apparatus of claim 17, wherein the filter system is a backflushable filter system.

19. The apparatus of claim 1, further comprising a membrane separation system in fluid communication with the reusable liquid fraction outlet port.

* * * * *